Jan. 1, 1924
O. BLEADO
EMERGENCY WHEEL SPOKE
Filed April 19, 1923
1,479,694
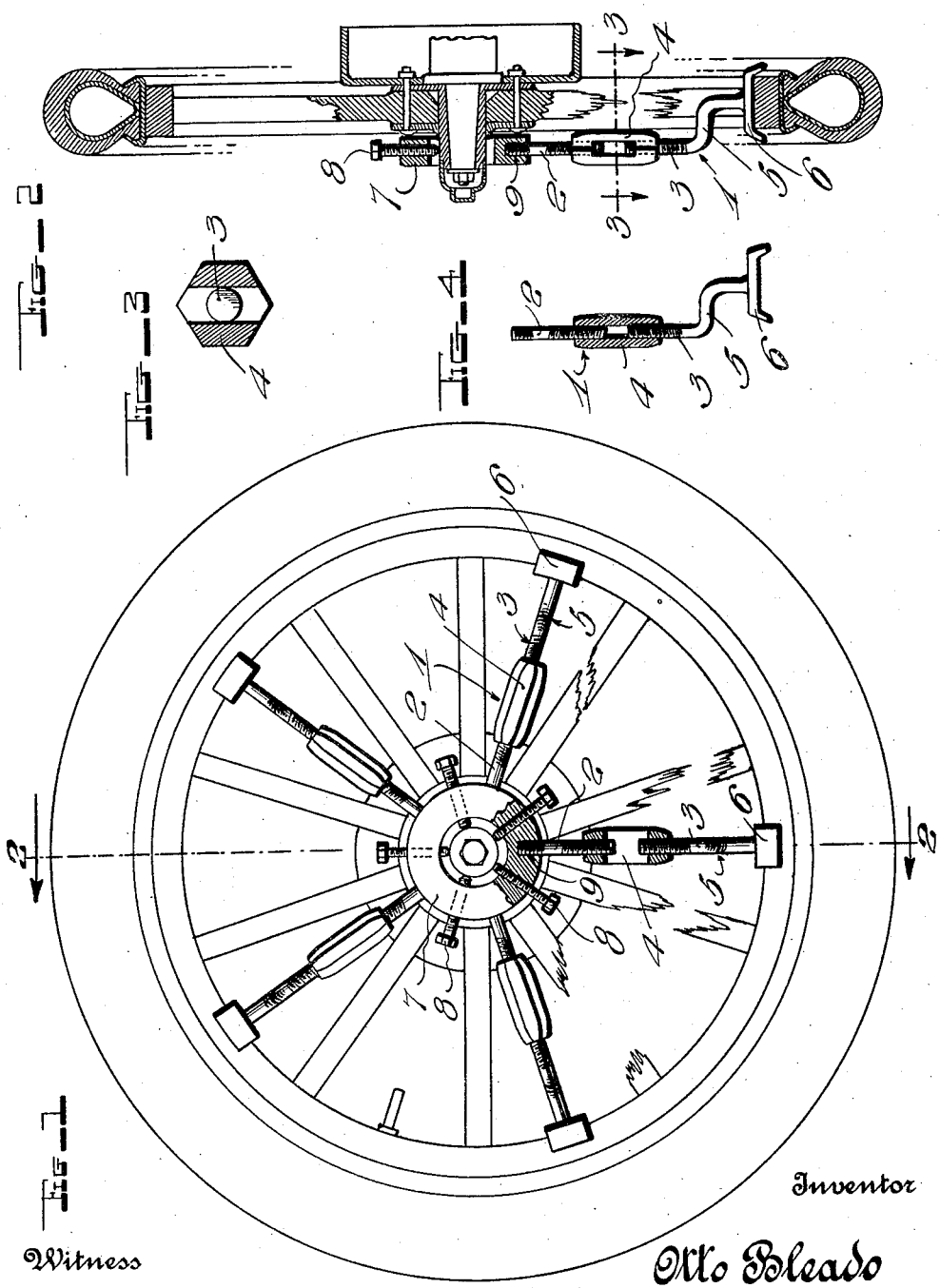

Patented Jan. 1, 1924.

1,479,694

UNITED STATES PATENT OFFICE.

OTTO BLEADO, OF MANISTEE, MICHIGAN.

EMERGENCY WHEEL SPOKE.

Application filed April 19, 1923. Serial No. 633,213.

*To all whom it may concern:*

Be it known that I, OTTO BLEADO, a citizen of the United States, residing at Manistee, in the county of Manistee and State of Michigan, have invented certain new and useful Improvements in Emergency Wheel Spokes; and I do declare the following to be a full, clear, and exact description of the invention, such as will enable others skilled in the art to which it appertains to make and use the same.

This invention relates to an improved spoke for wheels which is especially adapted to be used in case of an emergency to replace a broken spoke on an automobile wheel.

The principal object of the invention is to provide a simple type of spoke which is capable of being applied to the wheel without requiring any alterations of the latter, the construction of the emergency spoke being such that it can be placed in position in a very short while.

More specifically, it is an object of the invention to provide a repair device of the type specified which embodies a member adapted to encircle the wheel hub, this member being capable of application to different size hubs, and the spoke, which is associated with it, being extensible to permit it to be applied to different diameters of wheels.

Further, it is another object of the invention to provide a hub encircling member and an extensible supplemental spoke having its outer end off-set and provided with a head shaped to effectively engage with the wheel felly, whereby to produce a structure which is capable of application in a short period of time.

Other objects and advantages of the invention will be apparent during the course of the following description.

In the accompanying drawings forming a part of this specification and in which like numerals are employed to designate like parts throughout the same:—

Figure 1 is a side elevation of a conventional type of automobile wheel equipped with a number of emergency spokes constructed in accordance with this invention.

Fig. 2 is a central vertical section taken on the line 2—2 of Fig. 1, showing the construction of details more clearly.

Fig. 3 is a cross section, slightly enlarged, taken on the line 3—3 of Fig. 2.

Fig. 4 is a detail view of one of the emergency spokes.

In carrying out the invention I preferably employ a supplemental spoke 1 which is extensible to permit it to be applied to wheels of different diameters. As seen more clearly in Fig. 4, each spoke is composed of inner and outer sections 2 and 3 respectively, which have their adjacent ends provided with screw-threads and connected with a hexagonal nut 4. The threads of these parts are of course disposed in opposite directions so that when the nut is turned, the sections will be fed toward or from each other according to the direction of rotation of the nut. It is also to be noted that the inner end of the section 2 is provided with threads to serve a purpose to be hereinafter described. By carefully examining the outer section 3 of the spoke it will be seen that the outer end thereof is off-set inwardly as indicated at 5 and the extremity thereof carries a head 6 which is shaped to conform to the wheel felly with which it is adapted to be engaged when in use.

For the purpose of mounting the spoke on the wheel, a hub-encircling ring 7 is employed and as clearly seen, this is adapted to surround that portion of the hub which projects beyond the outer face of the wheel. It is also to be noted that the ring is made of a size to permit it to encircle hubs of varying diameters and so that the ring will be firmly held in place when in use, a plurality of set-screws 8 are carried by it and adapted to be engaged with the hub as more clearly seen in Fig. 2. It is to be noted that the ring 7 is provided at circumferentially spaced points with threaded sockets 9 for reception of the threaded inner ends of the spoke sections 2.

As before indicated, the supplemental spoke is primarily adapted for use in case of an emergency where one or more of the main spokes of the wheel become broken and render further use of the wheel unsafe. For the broken spoke, a supplemental spoke is substituted and in carrying out this end the hub-encircling ring 7 is placed about the portion of the hub extending beyond the outer face of the wheel and the set-screws are tightened to maintain it firmly in place. The supplemental spoke is then connected thereto and the nut 4 is rotated to adjust the spoke to properly fit the wheel. Prior to the adjustment the head 6 is of course engaged with the inner face of the wheel felly and when the nut is tightened sufficiently, the spoke will be held firmly in place and the wheel will be as strong as ever. The off-set end of the outer section 3 of the spoke will permit convenient application of the spoke. It may be pointed out here that it is of course practical to employ any number of these supplemental spokes to efficiently replace several broken spokes of the wheel. In practice the supplemental spokes will be made comparatively strong and it will indeed be safe to substitute the emergency device even if five or six of the spokes of the wheel are damaged. In this connection it may be brought out that the device is particularly advantageous in case of an accident damaging or in any way weakening the wheels.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:—

1. An emergency wheel spoke comprising a radially extensible member having its outer end directed at right angles to the body portion and having its extremity directed to extend in parallelism with said body portion, means carried by said extremity for connecting the member to the felly of a wheel, and means for connecting the inner end of said member with the hub of the wheel.

2. An emergency device for application to automobile wheels comprising a hub encircling ring, adjustable means carried thereby for connecting it with the wheel hub, and one or more supplemental spokes associated with said ring, each spoke being composed of sections adjustably connected together, one of said sections having its outer end off-set inwardly and provided with a head shaped to engage the wheel felly.

In testimony whereof I have hereunto affixed my signature.

OTTO BLEADO.